(12) United States Patent
Meacham

(10) Patent No.: US 7,074,255 B2
(45) Date of Patent: Jul. 11, 2006

(54) NOBLE METAL GAS BARRIERS

(76) Inventor: G. B. Kirby Meacham, 18560 Parkland Dr., Shaker Heights, OH (US) 44122

( * ) Notice: Subject to any disclaimer, the term of this patent is extended or adjusted under 35 U.S.C. 154(b) by 50 days.

(21) Appl. No.: 10/802,476

(22) Filed: Mar. 16, 2004

(65) Prior Publication Data

US 2006/0096453 A1 May 11, 2006

Related U.S. Application Data

(63) Continuation-in-part of application No. 10/696,251, filed on Oct. 29, 2003.

(51) Int. Cl.
*B01D 53/22* (2006.01)
*H01M 8/10* (2006.01)

(52) U.S. Cl. .............. 95/45; 95/54; 95/55; 95/56; 96/4; 96/11; 429/30; 429/33; 429/38; 429/39; 429/45; 429/53; 429/57; 429/82

(58) Field of Classification Search .......... 95/45–56; 96/4, 11; 429/30–34, 38, 39, 45, 53, 57, 429/82
See application file for complete search history.

(56) References Cited

U.S. PATENT DOCUMENTS

| | | | | |
|---|---|---|---|---|
| 3,429,748 A * | 2/1969 | Stankavich et al. | ............ | 429/11 |
| 3,901,668 A * | 8/1975 | Seitzer | .............. | 423/579 |
| 3,901,669 A * | 8/1975 | Seitzer | .............. | 423/648.1 |
| 4,374,907 A * | 2/1983 | Chuang et al. | ............ | 429/57 |
| 4,439,500 A * | 3/1984 | Gibbard et al. | ............ | 429/27 |
| 4,584,249 A * | 4/1986 | Smithrick | ............ | 429/57 |
| 4,756,835 A * | 7/1988 | Wilson | .............. | 210/651 |
| 4,810,598 A * | 3/1989 | Levy et al. | ............ | 429/59 |
| 4,925,746 A * | 5/1990 | Pavlov et al. | ............ | 429/57 |
| 5,264,131 A * | 11/1993 | Ishida et al. | ............ | 210/643 |
| 5,391,440 A | 2/1995 | Kuo et al. | | |
| 5,453,331 A | 9/1995 | Bloom et al. | | |
| 5,782,960 A * | 7/1998 | Ogawa et al. | ............ | 96/11 |
| 5,830,261 A * | 11/1998 | Hamasaki et al. | ............ | 96/6 |
| 5,942,349 A | 8/1999 | Badwal et al. | | |
| 5,958,304 A | 9/1999 | Khandkar et al. | | |
| 6,039,792 A * | 3/2000 | Calamur et al. | ............ | 95/45 |
| 6,051,517 A * | 4/2000 | Funke et al. | ............ | 502/4 |
| 6,083,297 A * | 7/2000 | Valus et al. | ............ | 95/44 |
| 6,106,967 A | 8/2000 | Virkar et al. | | |
| 6,168,878 B1 * | 1/2001 | Fauteux et al. | ............ | 429/59 |
| 6,183,897 B1 | 2/2001 | Hartvigsen et al. | | |
| 6,271,158 B1 | 8/2001 | Xue et al. | | |
| 6,280,868 B1 | 8/2001 | Badwal et al. | | |
| 6,355,093 B1 * | 3/2002 | Schwartz et al. | ............ | 95/56 |
| 6,444,340 B1 | 9/2002 | Jaffrey | | |
| 6,666,909 B1 * | 12/2003 | TeGrotenhuis et al. | ....... | 95/273 |
| 2001/0041281 A1* | 11/2001 | Wilkinson et al. | ............ | 429/34 |
| 2002/0051901 A1* | 5/2002 | Zuber et al. | ............ | 429/32 |

(Continued)

*Primary Examiner*—Jason M. Greene
(74) *Attorney, Agent, or Firm*—Peter F. Corless; Steven M. Jensen; Edwards Angell Palmer & Dodge, LLP

(57) ABSTRACT

A method for separating gases within a barrier, and a metallic barrier separating the gases is provided for use in solid oxide fuel cells, or SOFC. A network of pores can vent steam formed within the barrier by the reaction of hydrogen diffusing from one side and oxygen diffusing from the other side. This venting prevents the buildup of destructive pressure within the barrier, while retaining the required gas separation and electrical conductivity properties. The invention can be applied to systems other than solid oxide fuel cells and includes barriers made of noble metals and non-noble metals.

22 Claims, 3 Drawing Sheets

U.S. PATENT DOCUMENTS

2002/0094471 A1*   7/2002  Mercuri ........................ 429/44
2002/0119354 A1*   8/2002  O'Brien et al. ............... 429/20
2002/0155338 A1*  10/2002  Croset .......................... 429/38
2003/0077501 A1*   4/2003  Knights et al. ............... 429/38
2003/0113607 A1*   6/2003  Milgate et al. ............... 429/34
2003/0138686 A1*   7/2003  Kotani et al. ................. 429/32
2004/0038115 A1*   2/2004  Johnsen et al. ............... 429/40
2004/0076879 A1*   4/2004  Ovshinsky et al. ...... 429/218.2

* cited by examiner

NOBLE METAL GAS BARRIERS

CROSS-REFERENCE TO RELATED APPLICATION

The subject application is a continuation-in-part (CIP) of U.S. Ser. No. 10/696,251, filed on Oct. 29, 2003, the disclosure of which is incorporated by reference in its entirety.

FIELD OF THE INVENTION

The present invention is directed to barriers that separate fuel and oxidant gases in high temperature solid oxide fuel cells (SOFC) and cell stacks, and more particularly to a metallic barrier separating oxygen containing gas from hydrogen containing gas, and a method for controlling the diffusion and reaction of oxygen and hydrogen gas within the metallic barrier for preventing barrier damage.

BACKGROUND OF THE INVENTION

It is generally known to provide bipolar separators and seals that separate fuel and oxidant gases in SOFC systems.

Fuel cells are well known electrochemical systems that generate electrical current by chemically reacting a fuel gas and an oxidant gas on the surfaces of electrodes. Conventionally, the oxidant gas is oxygen or air, and in high temperature (600° C. to 1000° C.) SOFC the fuel gas can be hydrogen or a mixture of hydrogen, carbon monoxide, and traces of hydrocarbons. The fuel gas may also contain non-fuel gases including nitrogen, water vapor and carbon dioxide. Each cell produces a potential of less than 1 volt, so multiple cells are typically connected in series to produce a higher, more useful voltage. The series interconnection is often accomplished by constructing a bipolar stack of planar cells such that current flows from the anode of one cell to the cathode of the next cell. The stack output current is collected from the top and bottom cells at a voltage equal to the sum of the voltages of the individual cells. Fuel gas and oxidant gas must be supplied to each cell in the stack, while being kept separate so that they do not react with each other except on the surfaces of the electrodes. Direct reactions can cause a loss in energy conversion efficiency, and may generate high temperatures that damage the cell or stack structures. Therefore, barrier structures that separate fuel gas from oxidant gas provide an important function in fuel cell stacks. Two types of barriers exemplify these structures: bipolar separator plates (hereinafter also referred to as "bipolar separators") and seal gaskets.

A bipolar separator connects the anode of each cell in a stack to the cathode of an adjacent cell. These bipolar separators are in contact with the fuel gas on the anode side and the oxidant gas on the cathode side, and must be largely impermeable to these gases. In addition, they must be electronic conductors able to carry the current from one cell to the next. Further, they must be ionic non-conductors to avoid unwanted reactions between the fuel and oxidant gases. Finally, they must not deteriorate from interactions with the fuel and oxidant gases at elevated operating temperatures, and must have thermal expansion characteristics compatible with adjacent cells.

A number of metals and alloys have been investigated for possible use as separator plates. In general, pure metals and alloys that resist oxidation damage do so by forming an adherent oxide layer that is a barrier to further oxygen attack. While this oxide layer protects the bulk metal, the oxides are generally electronic insulators and severely restrict current flow. Chromium alloys such as high chromium ferric steel are an exception, and form an electronically conductive, adherent oxide. An example is iron with 18% chromium and 1% aluminum. One problem with such alloys is that the chromium forms volatile compounds in an oxidizing environment at the operating temperatures. These compounds tend to migrate and degrade other cell components, particularly at the cathode-electrolyte interface, as described in U.S. Pat. No. 6,444,340 (Jaffrey) and U.S. Pat. No. 5,942,349 (Badwal et al.). Jaffrey teaches that chromium can be replaced with noble metal conductors between the cathode and anode sides of a nonconductive bipolar separator to form the electrical interconnection. U.S. Pat. No. 6,183,897 (Hartvigsen et al.) follows a similar approach. In Badwal et al., a coating is applied to the cathode side of a chromium-containing bipolar separator, thereby capturing and separating the chromium-containing vapor. U.S. Pat. No. 6,280,868 (Badwal et al.) addresses nickel and chromium interdiffusion and oxidation problems on the anode side of a chromium-containing bipolar separator, and applies one or more noble metal layers as a protective barrier. For at least the reasons discussed above, chromium-based alloys are not preferred materials for use in bipolar separators.

Doped lanthanum chromite provides a nonmetallic alternative to chromium-based alloys, where doped lanthanum chromite is an electronically conductive, ionically non-conductive relatively impermeable ceramic. Moreover, doped lanthanum chromite is compatible with common fuel and oxidant gases, does not evolve chromium vapors, and has favorable expansion properties. It has been used successfully as a bipolar separator in the form of self-supporting separator plates made from bulk material and as thin films applied to cathode surfaces. U.S. Pat. No. 5,958,304 (Khandkar et al.) provides an example of formulations and processes for making self-supporting doped lanthanum-chromite separator plates. Problems with such separator plates include their high cost, and excessive weight and volume. Thin (30 to 100 micron) doped lanthanum chromite films applied to the cathode are a potential improvement, as described in U.S. Pat. No. 5,391,440 (Kuo et al.). Such films can be applied by electrochemical vapor deposition (EVD) and plasma spray with high temperature heat treatment to reduce porosity, but undesirably require processing steps at between 1350° C. and 1450° C. that are time-consuming and expensive. These high firing temperatures may damage other components, limiting their use in fabrication approaches where multiple cell components are combined green and co-fired. Further, the range of compositions that can be applied by EVD are limited, resulting in non-optimum thermal expansion and conductivity.

Seal gaskets are similar to bipolar separators in that they also form barriers between fuel and oxidant gases. Flow is blocked between internal openings and the exterior edge of a gasket, and from one internal opening to another. Some seal surfaces contact fuel gas, and other surfaces contact oxidant gas, resulting in requirements similar to bipolar separators. The seal gaskets must be ionic non-conductors, and largely impermeable to fuel and oxidant gases. Further, they must not deteriorate from interactions with the fuel and oxidant gases at elevated operating temperatures, and must have thermal expansion characteristics compatible with adjacent cells. Seal gaskets differ from bipolar separators in that seal gaskets are not required to be electronic conductors.

Glass-based seal gaskets are described in U.S. Pat. No. 5,453,331 (Bloom et al.) and U.S. Pat. No. 6,271,158 (Xue et al.). A glass and filler are selected such that the seal is somewhat viscous and compliant at the cell operating temperature, and thereby adjusts to fill the gaps. One problem is that the seals transition to elastic solids as the cell and stack assembly cools. This may generate significant stresses unless the solids are a good thermal expansion match with the cell and stack components. Another problem is that glasses often wet the cell and stack materials, and therefore migrate from their original locations. A further problem is that the glasses tend to interdiffuse with the cell materials, changing the properties of both substances.

U.S. Pat. No. 6,106,967 (Virkar et al.) addresses the problems of glass seals by employing a thin metallic foil as a combined bipolar separator and sealing gasket. The foil is sufficiently compliant in compression to conform to the mating surfaces and provide a seal. Further, the foil is thin enough such that it does not generate excessive thermal stresses, even with some mismatch in thermal expansion characteristics. Virkar et al. indicates that the foil should be a superalloy containing chromium, which leads to the difficulties with chromium discussed above.

The above-described bipolar separator plates and seals are not made of suitable materials to ensure durable electrical conductivity for use in SOFC cell power generation systems.

SUMMARY OF THE INVENTION

The present invention is directed to a method for separating at least two gases using a metallic barrier, where the barrier preferably is made of a noble metal such as silver. The invention also encompasses a metallic barrier for use in the foregoing method. Preferably, barriers for use in the present invention are generally formed as malleable, predominantly metallic structures, or all-metallic structures. Moreover, such metallic barriers preferably do not include brittle, low-conductivity oxide layers or volatile chromium oxides. The barriers may be freestanding structures. Alternatively, the barriers can be applied as coating layers that cover, either completely or partially, other fuel cell components including cathodes or anodes.

A barrier according to the present invention incorporates fluidly connected pores that extend from one or more faces or surfaces of the barrier into the barrier interior. Preferably, the fluidly connected pores are capable of venting steam formed by a reaction of hydrogen diffusing into the barrier from one face and oxygen diffusing into the barrier from the other face, thereby preventing buildup of destructive internal pressure. The pores can be configured and arranged either on or adjacent to the air side of the barrier, the fuel side, or both. Preferably the pores can prevent hydrogen and oxygen from entering through the pores because of steam outflow. Instead, hydrogen and oxygen can enter only by diffusion into the exposed metal surface between the pores, limiting the overall hydrogen and oxygen losses to acceptable levels.

The pores can be formed using one or more known processes. For example, the pores may be an intrinsic feature of barriers formed by powder metallurgy. Alternatively, the pores may be formed indirectly by compounding fully dense materials that develop the required porosity in service.

The present invention is capable of advancing the practical application of SOFC by introducing a mechanism for using noble metals and/or non-noble metals to form durable electrically conductive chromium-free ductile metal barriers between fuel and air gases.

It should be understood that the detailed description of the invention and the specific examples presented, while indicating certain embodiments of the present invention, are provided for illustration purposes only. Various changes and modifications within the spirit and scope of the invention will become apparent to those of ordinary skill in the art upon examination of the following detailed description of the invention and claims that follow.

BRIEF DESCRIPTION OF THE DRAWINGS

The appended claims set forth those novel features that characterize the invention. However, the invention itself, as well as further objects and advantages thereof, will best be understood by reference to the following detailed description of preferred embodiments. The accompanying drawings, where like reference characters identify like elements throughout the various figures, in which:

DETAILED DESCRIPTION OF THE INVENTION

The present invention relates to metallic barriers or seals that separate fuel and oxidant gases in high temperature systems, and methods for separating at least two gases using the metallic barriers or seals. The invention is described with respect to high temperature solid oxide fuel cells (SOFC) and cell stacks operating with air and hydrogen-containing fuel gas. However, it will be apparent to those skilled in the art that the following detailed description is similarly applicable to other types of high temperature systems that require barriers or seals between reducing and oxidizing substances. A metal barrier according to the present invention incorporates one or more fluidly connected pores extending from the barrier surface (also referred to as a barrier face) to an interior of the barrier. The barrier can be made of one or more noble metals or other metals.

Metallic barriers according to this invention may be self-supporting structures. Alternatively, they may be provided as coating layers applied to other components including fuel cell cathodes or anodes. In each case, the metallic barriers should be capable of separating at least two gases in a fuel cell.

Figure 1:
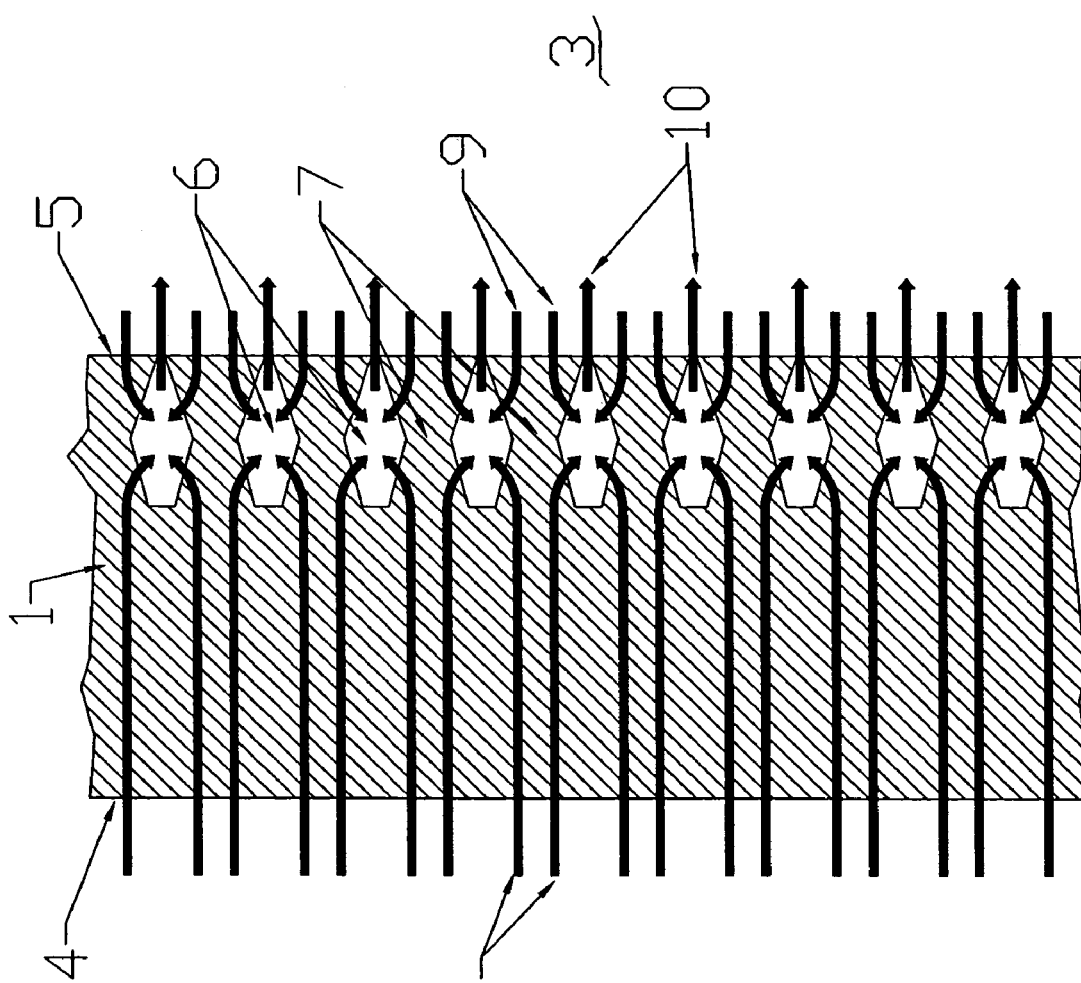
FIG. 1 is a schematic illustration of hydrogen and oxygen diffusing into a barrier and reacting to form water vapor which is vented through pores in the fuel side barrier face according to a first preferred embodiment of the invention.

FIG. 1 provides a schematic illustration of a first preferred embodiment of the invention, in which hydrogen and oxygen, or other known substitutes, diffuse into a barrier and react to form water vapor. According to the first preferred embodiment, the water vapor is then vented through pores on or adjacent to a fuel side barrier face. As shown in FIG. 1, a barrier 1 separates oxygen-containing air 2 from hydrogen-containing fuel gas 3. An air face 4 of the barrier 1 contacts air 2, and a fuel face 5 contacts fuel gas 3. It will be readily apparent to those of ordinary skill in the art that the fuel gas 3 can be hydrogen, but also can contain other gases such as water vapor, nitrogen, carbon dioxide, carbon monoxide, or hydrocarbons. The air 2 preferably contains oxygen, but can also contain other gases. Pores 6 extend into the barrier 1 from the fuel face 5, but do not extend through to air face 4. A plurality of conducting bridges 7 are formed in the barrier 1 and preferably provide electrical continuity between the air face 4 and the fuel face 5. The air face 4 and at least a portion of the thickness of the barrier 1 are composed of one or more noble metals such as silver or gold that do not form an oxide layer in the presence of oxygen. The fuel face 5 and a balance of the thickness of the barrier 1 are composed of one or more noble metals or a metallic composition that is stable and electronically conductive in the fuel gas environment. Oxygen 8 diffuses into the air face 4 and hydrogen 9 diffuses into the fuel face 5, and the oxygen 8 and hydrogen 9 meet and react within the pores 6. As a result of this reaction, steam 10 flows out of the pores 6, limiting internal pressure buildup within the barrier 1. The steam 10 that flows out of the pores can minimize hydrogen diffusion into the pores, thereby restricting hydrogen diffusion to solid areas of the fuel face 5.

Figure 2:
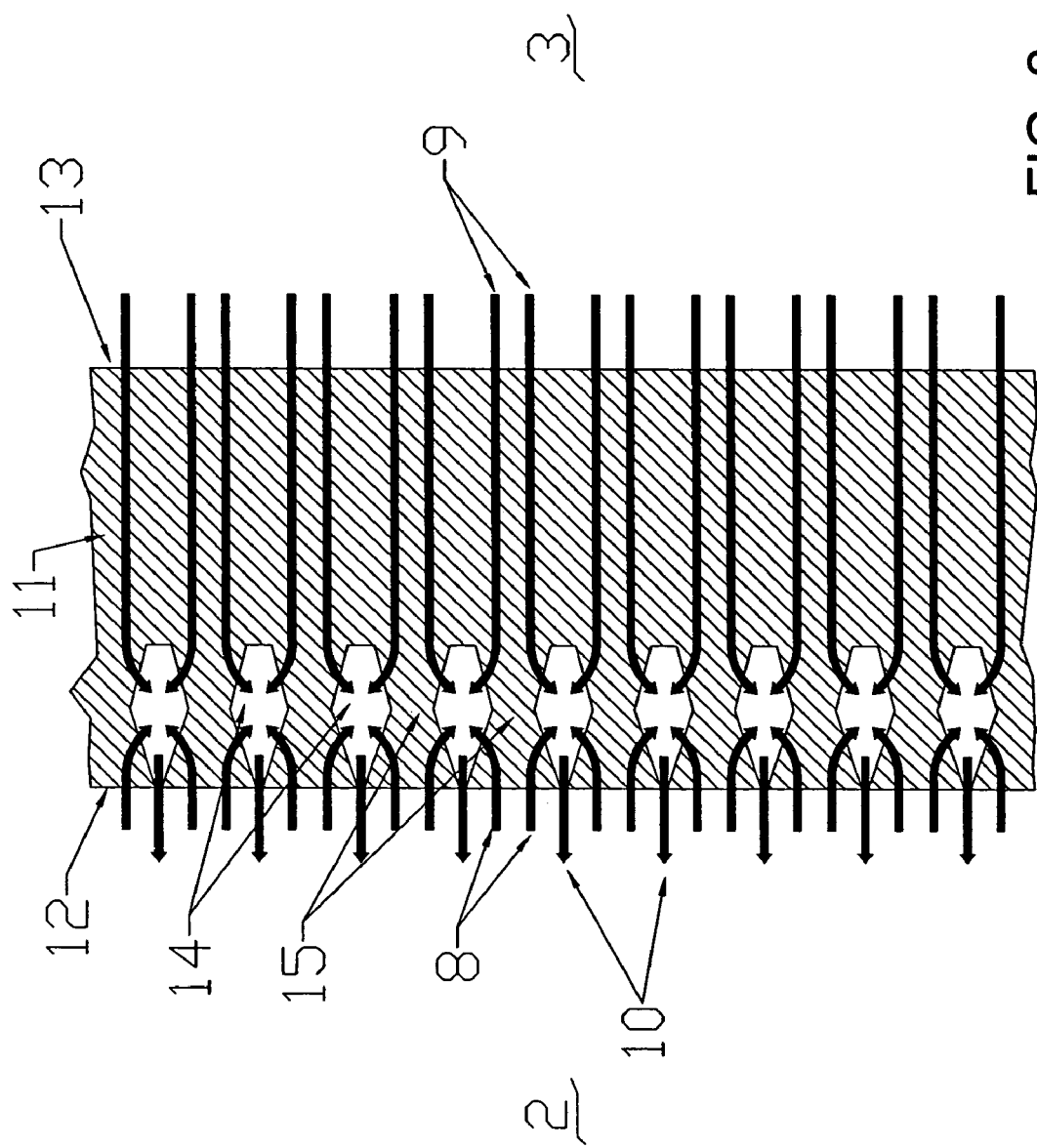
FIG. 2 is a schematic illustration of hydrogen and oxygen diffusing into a barrier and reacting to form water vapor which is vented through pores in the air side barrier face according to a second preferred embodiment of the invention.

FIG. 2 provides a schematic illustration of a second preferred embodiment of the invention, in which water vapor formed by hydrogen and oxygen is vented through pores on or adjacent to an air side barrier face. A barrier 11 separates the oxygen-containing air 2 from the hydrogen-containing fuel gas 3. An air face 12 of the barrier 11 contacts air 2, and the fuel face 13 contacts fuel gas 3. Pores 14 extend into the barrier 11 from the air face 12, but do not extend through to the fuel face 13. A plurality of conducting bridges 15 are formed in the barrier 11 and preferably provide electrical continuity between the air face 12 and the fuel face 13. The air face 12 and at least a portion of the thickness of the barrier 11 are composed of one or more noble metals such as silver or gold that do not form an oxide layer in the presence of oxygen. The fuel face 13 and a balance of the thickness of the barrier 11 are composed of one or more noble metals or a metallic composition that is stable and electronically conductive in the fuel gas environment. Oxygen 8 diffuses into the air face 12 and hydrogen 9 diffuses into the fuel face 13, and the oxygen 8 and hydrogen 9 meet and react within the pores 14. As a result of this reaction, steam 10 flows out of the pores 14, limiting internal pressure buildup within the barrier 11. The steam that flows out of the pores minimizes oxygen diffusion into the pores, thereby restricting oxygen diffusion to solid areas of the air face 12.

Figure 3:
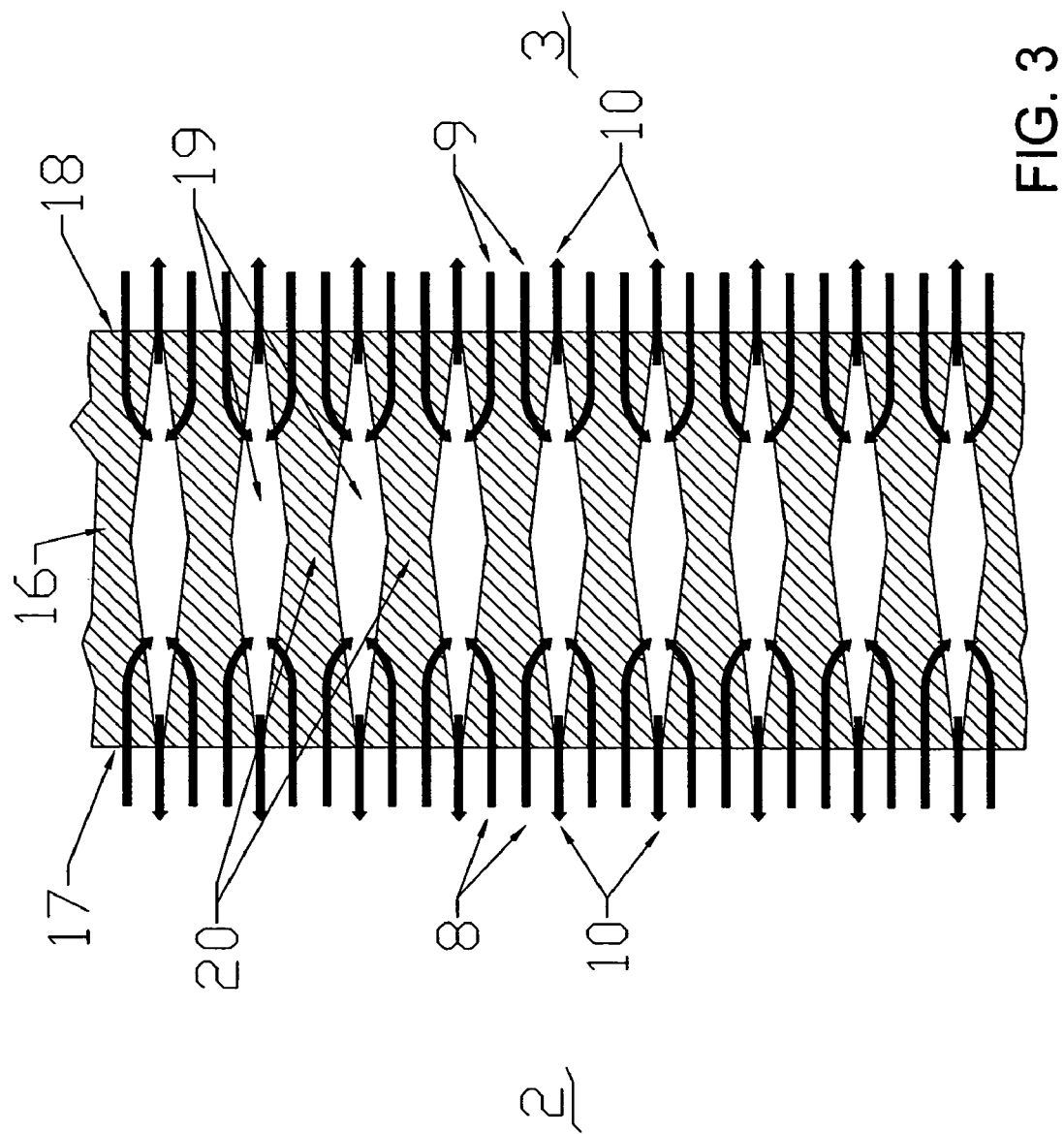
FIG. 3 is a schematic illustration of hydrogen and oxygen diffusing into a barrier and reacting to form water vapor which is vented through pores in the fuel side and air side barrier faces according to a third preferred embodiment of the invention.

FIG. 3 provides a schematic illustration of a third preferred embodiment of the invention, in which water vapor formed by hydrogen and oxygen is vented through pores on or adjacent to both an air side barrier face and a fuel side barrier face. A barrier 16 separates oxygen-containing air 2 from hydrogen-containing fuel gas 3. An air face 17 of the barrier 16 contacts air 2, and a fuel face 18 contacts fuel gas 3. Pores 19 extend into the barrier 16 from the air face 17 and from the fuel face 18 and may interconnect within the barrier 16. According to the third preferred embodiment, at least a first portion of each pore 19 is connected to barrier surfaces contacted by the oxygen-containing air 2, and at least a second portion of each pore 19 is connected to barrier surfaces contacted by the hydrogen-containing fuel gas 3. Conducting bridges 20 provide electrical continuity between the air face 17 and the fuel face 18. The air face 17 and at least a portion of the thickness of the barrier 16 are composed of one or more noble metals such as silver or gold that do not form an oxide layer in the presence of oxygen. Fuel face 18 and a balance of the thickness of the barrier 16 are composed of one or more noble metals or a metallic composition that is stable and electronically conductive in the fuel gas environment. Oxygen 8 diffuses into the air face 17 and hydrogen 9 diffuses into the fuel face 18, and the oxygen 8 and hydrogen 9 meet and react within the pores 19 forming steam 10. Preferably, the pores are of such dimensions that the absolute pressure of steam 10 in pores 19 is higher than the pressures of air 2 or fuel gas 3 at the pore openings. This assures that there is flow of steam 10 outward through the pores, preventing bulk inflow of air 2 or fuel gas 3. The steam flow out of the pores minimizes oxygen and hydrogen diffusion into the pores, restricting diffusion of oxygen 8 to the solid areas of air face 17 and diffusion of hydrogen 9 to the solid areas of fuel face 18. The overall result is that bulk flow of fuel gas or air through the barrier 16 is blocked by the relatively high pressure steam 10 in the pores 19.

The above-described three preferred embodiments of the invention are but three examples of porosity patterns capable of venting steam and preventing destructive pressure buildup according to the present invention, and a variety of other porosity patterns could be substituted for the depicted embodiments and remain within the scope of the invention. With regard to at least the third embodiment, unexpected results were produced. As described above, in the third embodiment, the pores 19 extend through the noble metal barrier 16 separating oxygen and hydrogen-containing gases, but do not cause bulk gas flow through the barrier. The porosity acts only as a steam vent, and the hydrogen and oxygen flow is governed by the diffusion of the gases in the metal. The present invention provides robust barriers that do not rely on precise control of porosity, and accommodate changes in porosity over the operating life of the barrier.

The air side of the barrier, whether porous or solid, can be made of a noble metal or a composite of one or more noble metals and non-reactive material such as ceramic that will not form a surface oxide layer in air at SOFC operating temperatures. The hydrogen side can be made of one or more noble metals or other metals, metal alloys or cermets that are electronically conductive and stable in the fuel gas mixture. Examples of such metallic compositions include alloys or mixtures of non-noble and noble metals such as nickel, copper, cobalt, silver and gold. Additional examples include cermet compositions in which particles of ceramics stable in a reducing atmosphere are combined with the previously mentioned metals. Such ceramics include alumina, zirconia or lanthanum chromite, and may serve to reduce material cost and modify physical properties such as the coefficient of thermal expansion. It should be noted that fuel gas often contains water vapor, nitrogen, carbon dioxide, carbon monoxide, and hydrocarbons in addition to hydrogen. In particular, resistance to carbide formation may be a consideration. Further, non-noble materials contacting the noble metal must exhibit acceptable rates of interdiffusion and other reactions with the noble metal at the operating temperature.

A number of methods or mechanisms are available to form porous metallic structures, and the use of any such mechanisms is within the scope of the present invention. The following methods are presented as examples. Powder metallurgy can be used to directly produce such structures. Electronically conductive metal powder and other elements including non-reactive ceramic particles can be mixed, pressed and sintered to produce a porous structure. The porosity preferably is controlled according to the choice of ingredients and the processing conditions, and fugitive pore formers that burn out during sintering may be included. Porous barriers may be also be formed indirectly by compounding materials that develop increased porosity in service. Copper oxide inclusions in silver, for example, reduce to copper metal when exposed to hydrogen. The copper metal has a smaller volume than the oxide, resulting in the formation of pore volume. Nickel oxide in noble metal is expected to have similar properties.

A method for producing electronically conductive barriers according to the present invention is now described. Consider a barrier material separating gas A from gas B, where gases A and B are both soluble in and diffuse through the barrier material. For example, gas A can be oxygen, gas B can be hydrogen, and the barrier material can be selected from the materials described above. The barrier can be constructed from a range of ceramic, glass and composite materials in addition to metals and conductive cermets. If gases A and B react with each other within the barrier material to form a product gas C, such as steam, which is substantially insoluble in the barrier material, high pressure may develop and physically disrupt the material. According to the invention, a network of interconnected pores lead from the reaction area within the barrier to the barrier surface to vent the product gas C and limit its pressure. Preferably, the pores are of such dimensions that the absolute pressure of product gas C in a pore is higher than the absolute pressures of gas A or gas B at the pore openings. This assures that there is a flow of the product gas C outward through the pores, preventing bulk inflow or through-flow of gases A or B. The upper limit of the absolute pressure of the product gas C within the barrier is determined by the physical strength of the barrier.

In one example of a method according to the present invention, the barrier material preferably is inert relative to the gases A and B, and the product gas C. In another example, the composition of the barrier material can vary over the surface of the metal barrier such that gases A and B, and the product gas C contact only portions of the barrier which are inert to the gases A and B, and the product gas C. Preferably at least a portion of the barrier material is electronically conductive, and more preferably is a noble metal.

The foregoing embodiments of the present invention have been presented for the purposes of illustration and description. These descriptions and embodiments are not intended to be exhaustive or to limit the invention to the precise form disclosed, and obviously many modifications and variations are possible in the light of the above disclosure. The embodiments were chosen and described in order to best explain the principle of the invention and its practical applications to thereby enable others skilled in the art to best utilize the invention in its various embodiment and with various modifications as are suited to the particular use contemplated. It intended that the invention be defined by the following claims.

What is claimed is:

1. A metallic barrier separating oxygen containing gas and hydrogen containing gas, comprising:
   one or more fluidly connected pores leading from an interior of the barrier to one or more barrier surfaces,
   wherein at least a portion of the metallic barrier comprises a noble metal.

2. The metallic barrier of claim 1, wherein the barrier surfaces are contacted by the hydrogen containing gas.

3. The metallic barrier of claim 1, wherein the barrier surfaces are contacted by the oxygen containing gas.

4. The metallic barrier of claim 1, wherein
   at least a first portion of the fluidly connected pores is connected to barrier surfaces contacted by the oxygen containing gas, and
   at least a second portion of the fluidly connected pores is connected to barrier surfaces contacted by the hydrogen containing gas.

5. The metallic barrier of claim 1, wherein the fluidly connected pores extend from barrier surfaces contacted by the oxygen containing gas to barrier surfaces contacted by the hydrogen containing gas.

6. The metallic barrier of claim 1, wherein the oxygen containing gas contacts the portion of the metallic barrier that comprises the noble metal.

7. The metallic barrier of claim 1, wherein the hydrogen containing gas contacts copper or nickel, the copper or nickel being in contact with the portion of the metallic barrier that comprises the noble metal.

8. The metallic barrier of claim 1, wherein the metallic barrier further comprises ceramic particles selected from the group consisting of: alumina, zirconia, and lanthanum chromite, the ceramic particles being in contact with the portion of the metallic barrier that comprises the noble metal.

9. The metallic barrier of claim 1, wherein the metallic barrier further comprises metal oxide particles including at least one metal selected from the group consisting of: copper, nickel, palladium, platinum, rhodium, iridium, iron, and ruthenium, the metal oxide particles being in contact with the portion of the metallic barrier that comprises the noble metal.

10. The metallic barrier of claim 1, wherein the metallic barrier comprises copper or nickel, and further comprises particles selected from the group consisting of: alumina, zirconia, and lanthanum chromite, the particles being in contact with the portion of the metallic barrier that comprises the noble metal.

11. A method of separating gas A from gas B with a barrier, comprising the steps of:
    providing the barrier made of a barrier material including at least a noble metal, such that the gases A and B are both soluble in and diffuse through the barrier material,
    forming a product gas C by reacting the gases A and B with each other within the barrier material, the product gas C being substantially insoluble in the barrier material; and
    venting the product gas C through a plurality of pores leading from an interior of the barrier material to one or more barrier surfaces, so as to limit the pressure of the product gas C within the barrier material.

12. The method of claim 11, wherein the gas A contains oxygen, the gas B contains hydrogen, and the product gas C comprises steam.

13. The method of claim 11, wherein the barrier material is inert relative to the gases A and B and the product gas C.

14. The method of claim 13, wherein the composition of the barrier material varies according to position within the barrier such that the gases A, B and the product gas C only contact material inert to the gases A, B and the product gas C respectively.

15. The method of claim 13, wherein at least a portion of the barrier material is an electronically conductive metal in contact with the noble metal of the barrier.

16. The method of claim 13, wherein at least a portion of the barrier material is an oxide, ceramic or glass in contact with the noble metal of the barrier.

17. The method of claim 11, wherein the absolute pressure of the product gas C in one of the plurality of pores is higher than the absolute pressure of the gas A or the product gas C at a pore opening, such that outward flow of the product gas C prevents entry of the gas A or the product gas C.

18. The method of claim 11, wherein the absolute pressure of the product gas C in one or more of the plurality of pores is below a level that causes structural damage to the barrier material.

19. A solid oxide filet cell, comprising:
   a barrier having a first face, a second face, and a plurality of pores leading from an interior of the barrier to the first or second faces, wherein at least a portion of the barrier comprises a noble metal;
   an oxygen-containing gas contacting the first face of the barer; and
   a hydrogen-containing gas contacting the second face of the barrier;
   wherein the oxygen-containing gas and the hydrogen-containing gas diffuse into the barrier and react to form a mixture of steam, the mixture being vented through the pores to the first or second faces.

20. The solid oxide fuel cell of claim 19, wherein the pores are connected to the first face of the barrier.

21. The solid oxide fuel cell of claim 19, wherein the pores are connected to the second face of the barrier.

22. The solid oxide fuel cell of claim 19, wherein the pores are connected to both the first and second faces of the barrier.

* * * * *